Patented July 6, 1948

2,444,525

UNITED STATES PATENT OFFICE 2,444,525

ACETALS AND MERCAPTALS OF ALDEHYDES HAVING TWO VICINAL MERCAPTO GROUPS AND THEIR SELF-CONDENSATION POLYMERS AND PROCESS FOR PREPARING SAME

Albert A. Pavlic, Claymont, Del., assignor to E. I. du Pont de Nemours & Company, Wilmington, Del., a corporation of Delaware No Drawing. Application December 7, 1945, Serial No. 633,535

18 Claims. (Cl. 260—609)

This invention relates to acetals and mercaptals of aldehydes having two vicinal mercapto groups and to their self-condensation polymers. It also relates to processes for making these compounds.

The acetals and mercaptals of aldehydes having two vicinal mercapto groups and having the carbonyl oxygen replaced by two monovalent organic radicals bonded to the carbonyl carbon through bivalent chalcogen atoms of atomic weight less than 33 constitute a hitherto unknown class of compounds. These are well adapted to serve as intermediates in numerous chemical syntheses because of the presence in the same molecule of two mercapto groups and the two groups bonded to the carbonyl carbon through chalcogen.

An object of this invention is the above-described new class of compounds, and the self-condensation polymers of the oxoacetals. Another object is to provide processes for the preparation of these compounds. Other objects will appear hereinafter.

These objects are accomplished by the present invention of acetals and mercaptals of vicinal dimercapto saturated aliphatic aldehydes in which acetals and mercaptals the carbonyl oxygen of the aldehyde is replaced by two monovalent organic radicals, bonded to the carbonyl carbon thru bivalent chalcogen atoms of atomic weight less than 33. 1,1-dialkoxyalkane-dithiols wherein the mercapto groups are on adjacent carbons are preferred.

The compounds of this invention include both the oxoacetals and the mercaptals. The invention also includes the process of preparing vicinal dimercaptooxoacetals by reacting vicinal dihalooxoacetals with alkali metal hydrosulfides, the process of preparing vicinal dimercaptomercaptals by reacting vicinal dimercaptooxoacetals with a hydrocarbon monothiol, and the self-condensation polymers of the oxoacetals.

The process for the preparation of vicinal dimercaptooxoacetals is illustrated by the following equation for the preparation of alpha,beta-dimercaptopropionaldehyde diethyl acetal:

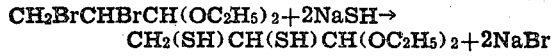

The preparation of vicinal dimercaptomercaptals is illustrated by the following equation representing the formation of alpha,beta-dimercaptopropionaldehyde diethyl mercaptal:

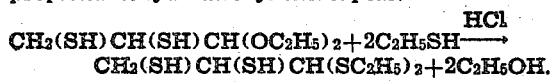

The dihaloacetals used in the preparation of the dimercaptoacetals of this invention can be prepared by the method described by Grard in Ann. Chim. (10), 13, 337, (1930). According to this method acrolein is brominated at low temperature and the resulting alpha,beta-dibromopropionaldehyde, which is isolated by distillation at reduced pressure, is then reacted with ethyl orthoformate to form alpha,beta-dibromopropionaldehyde diethyl acetal.

The invention is illustrated in greater detail by the following examples in which the proportions of ingredients are expressed in parts by weight.

Example I

One hundred fifty (150) parts of alpha,beta-dibromopropionaldehyde diethyl acetal is charged into a stainless steel bomb with a cold methanolic sodium hydrosulfide solution prepared by dissolving 37 parts of sodium in 400 parts of methanol and saturating the solution with hydrogen sulfide at 0° C. After 48 hours' agitation at room temperature under a hydrogen sulfide pressure of 100 lb./sq. in., the solution is saturated with carbon dioxide and treated with 1200 parts of water to dissolve the inorganic salts. The oily organic layer is separated, the aqueous layer extracted with ether and the oily layer and ether extracts combined, washed with water containing a few drops of acetic acid, and dried. Evaporation of the ether leaves 98 parts of a light colored oil which is alpha,beta-dimercaptopropionaldehyde diethyl acetal of 91.5% purity, as judged by its thiol sulfur content of 29.9% (theory 32.68%). The product may be purified by distillation, which, however, causes partial polymerization with evolution of ethanol. Thus, 25 parts of the above crude reaction product heated in a still at 110–120° C. at 0.25 mm. pressure gives 17 parts of a colorless distillate (no accurate head temperature can be observed) which is pure alpha,beta-dimercaptopropionaldehyde diethyl acetal.

Anal. Calcd. for $C_7H_{16}O_2S_2$: C, 43.09; H, 8.15; S, 32.68; thiol S, 32.68. Found: C, 43.12; H, 8.07; S, 30.74; thiol S, 31.2.

The residue of this distillation (7 parts) is a very viscous oil which sets on cooling to a light colored friable solid insoluble in the common organic solvents and having no definite melting point. This solid contains 37.16% carbon, 5.55% H, 45.7% S, and very little thiol sulfur. It is a self-condensation polymer produced by removal of ethanol between the thiol and the ethoxy groups of the dimercaptoacetal. Similar polymers form, with separation of ethanol, when the monomeric dimercaptopropionaldehyde acetal is allowed to stand at room temperature for several days.

Example II

A mixture of 32 parts of alpha,beta-dimercaptopropionaldehyde diethyl acetal (purity 92% as judged by the thiol sulfur content) and 100 parts of ethanethiol is cooled to about −30° C. and treated with a few drops of concentrated aqueous hydrochloric acid. After one-half hour, the mixture is allowed to warm up to room temperature. After 16 hours, the excess ethanethiol is removed by warming the reaction product in a stream of nitrogen, the residue then being washed with water, dried, and distilled. Between 70 and 110° C. at 0.5 mm. pressure, there is obtained 13 parts of distillate which analyzes for 51.4% total sulfur and 27% thiol sulfur, as compared with the calculated values of 56.16% and 28.08% for alpha,beta-dimercaptopropionaldehyde diethyl mercaptal. This product slowly loses thiol sulfur on standing at room temperature, but it shows no tendency to polymerize.

The invention has been illustrated with particular reference to the diethyl acetal and the diethyl mercaptal of alpha,beta-dimercaptopropionaldehyde. However, the invention includes any oxoacetal or mercapto of any saturated aliphatic vicinal dimercaptoaldehyde such as beta, gamma - dimercaptobutyraldehyde, alpha,beta-dimercaptobutyraldehyde and 10,11-dimercaptoundecanal. The invention also includes the self-condensation polymers of any of these oxoacetals.

So far as is known the process for the preparation of vicinal dimercaptooxoacetals illustrated by Example I is applicable to any saturated aliphatic vicinal dihalooxoacetal, but vicinal dihaloalkanal acetals are preferred. In these the two halogen atoms and the two acetal substituents are the only substituents on an alkane. The halogen atoms can be either chlorine, bromine or iodine and the alkoxy radical of the acetal can be one derived from any aliphatic alcohol, those from the lower aliphatic alcohols being preferred. Specific examples of other dihalooxoacetals which can be used include the dimethyl and the diethyl oxoacetals of beta,gamma-dibromobutyraldehyde, 10,11-dichloroundecanal, and beta-methyl-beta,gamma-dibromobutyraldehyde.

In addition to sodium hydrosulfide other alkali metal hydrosulfides, e. g. potassium hydrosulfide and ammonium hydrosulfide, can be used in the process of Example I. These alkali metal hydrosulfides are preferably used in excess, e. g. in at least 25-50% excess over the amount theoretically required to react with the dihalooxoacetal.

The reaction proceeds over a wide range of temperatures but the reaction is preferably carried out at a temperature between 0° and 80° C. It is also preferable to carry out the reaction under pressure of hydrogen sulfide, although this is not necessary. When carried out under a pressure of hydrogen sulfide amounting to at least 50 lb./sq. in., improved yields are obtained. Higher pressures than 150-200 lb./sq. in. can be used if desired but they are not necessary for obtaining satisfactory yields.

Example I illustrates the use of methanol as the reaction medium; however, any other inert liquid in which the reactants are sufficiently soluble, e. g. ethyl alcohol and dioxane, may be used. When the solvent is to be separated by distillation it should have a boiling point sufficiently different from that of the reaction product to permit its easy separation.

As indicated previously, the vicinal dimercaptooxoacetals of this invention polymerize on standing at ordinary temperatures. However, they are preferably polymerized by heating the monomer to a temperature of 100-150° C. with continuous removal of the alcohol that is formed.

The term "chalcogen" includes oxygen, sulfur, selenium, and tellurium according to the report of the committee of the International Union of Chemistry for the Reform of Inorganic Chemical Nomenclature, J. Am. Chem. soc. vol. 63, page 892 (1941). Of these elements oxygen and sulfur are of atomic weight less than 33.

The invention is not limited to the exact details shown and described for modifications thereof and deviations therefrom within the skill of the art will occur to a skilled chemist.

What is claimed is:

1. Alpha,beta - dimercaptopropionaldehyde diethyl acetal of the formula

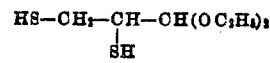

2. A compound of the formula $$HSCH_2CH(SH)CH(XC_2H_5)_2$$

wherein X is an atom of the class consisting of oxygen and sulfur.

3. A compound of the formula $$RCH(SH)CH(SH)CH(XR')_2$$

wherein R and R' are lower alkyl groups and X is an atom of the class consisting of oxygen and sulfur.

4. A compound of the class consisting of acetals and mercaptals of dimercaptoalkanals in which compound the two thiol groups are on adjacent carbons and the carbonyl oxygen of the aldehyde is replaced by two monovalent groups each having a lower alkyl bonded through an atom of the class consisting of oxygen and sulfur to the carbonyl carbon.

5. A compound of the class consisting of acetals and mercaptals of dimercapto saturated aliphatic aldehydes in which compound the two thiol groups are on adjacent carbons and the carbonyl oxygen of the aldehyde is replaced by two monovalent groups each having a lower alkyl bonded through an atom of the class consisting of oxygen and sulfur to the carbonyl carbon.

6. An acetal of a dimercapto saturated aliphatic aldehyde in which acetal the two thiol groups are on adjacent carbons and the carbonyl oxygen of the aldehyde is replaced by two RO groups wherein R is lower alkyl.

7. A polymer of the self-condensation, with evolution of alkanol of an acetal of a dimercapto saturated aliphatic aldehyde in which acetal the two thiol groups are on adjacent carbons and the carbonyl oxygen of the aldehyde is replaced by two RO groups wherein R is lower alkyl.

8. A polymer of the self-condensation, with alkanol evolution, of a lower alkanol acetal of a dimercapto alkanal which has the two thiol groups on adjacent carbons.

9. A polymer of the self-condensation, with alkanol evolution, of a 1,1-dialkoxyalkanedithiol wherein the mercapto groups are on adjacent carbon atoms and the alkyl of the alkoxy groups is a lower alkyl.

10. A condensation product of the self-condensation, with ethanol evolution, of alpha,beta-dimercaptopropionaldehyde diethyl acetal.

11. A polymer of the self-condensation, with ethanol evolution, of alpha,beta-dimercaptopropionaldehyde diethyl acetal.

12. Process for the preparation of lower alkanol acetals of vicinal dimercapto saturated aliphatic aldehydes which comprises reacting the corresponding acetal of a dihalogeno saturated aliphatic aldehyde having the halogens on adjacent carbons with sodium hydrosulfide and isolating the dimercapto acetal.

13. Process for the preparation of 1,1-diethoxypropane-2,3-dithiol which comprises reacting 1,1-diethoxy-2,3-dibromopropane under a hydrogen sulfide pressure of at least 50 lbs. per sq. in. at 0°–80° C. with a 25–50% excess of an alkali metal hydrosulfide.

14. Process for the preparation of mercaptals of dimercapto saturated aliphatic aldehydes having the two thiol groups on adjacent carbons which comprises reacting the corresponding dimercaptooxoacetals with a hydrocarbon monothiol.

15. Process which comprises reacting a dihalogeno acetal, in which the halogens are on adjacent carbons of the aldehyde portion of the molecule, with an alkali metal hydrosulfide and isolating the thus obtained acetal of the dimercapto saturated aliphatic aldehyde having the thiol groups on adjacent carbons.

16. Process which comprises reacting a lower alkanol acetal of a saturated aliphatic dihalogenoaldehyde wherein the halogens are on adjacent carbons with an alkali metal hydrosulfide and isolating the thus obtained lower alkanol acetal of the dimercapto saturated aliphatic aldehyde having the two thiol groups on adjacent carbons.

17. A compound from the class consisting of mercaptals and acetals of dimercapto saturated aliphatic aldehydes wherein the carbonyl oxygen of the aldehyde is replaced by two RX groups wherein R is alkyl of not more than two carbons and X is a member of the class consisting of oxygen and sulfur respectively.

18. Alpha,beta-dimercaptopropionaldehyde diethyl mercaptal.

ALBERT A. PAVLIC.

REFERENCES CITED

The following references are of record in the file of this patent:

UNITED STATES PATENTS

| Number | Name | Date |
|---|---|---|
| 2,100,968 | Lilienfeld | Nov. 30, 1937 |

OTHER REFERENCES

Rheinboldt et al. "Ber Deut. Chem. Ges." vol. 70B (1937) (Copy in Sci. Li.) pages 675 to 680.

Rothstein "Journal Chem. Soc." (London) July–Dec. (1940) pages 1551–1560.